(12) United States Patent
Kefes (10) Patent No.: US 6,482,094 B2
(45) Date of Patent: Nov. 19, 2002

(54) SELF-ALIGNING SPLINED MALE SHAFT HEAD AND ENGAGEMENT METHOD

(75) Inventor: Burkhard Kefes, Leonard, MI (US)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 09/810,289

(22) Filed: Mar. 16, 2001

(65) Prior Publication Data

US 2002/0131844 A1 Sep. 19, 2002

(51) Int. Cl.⁷ .................................................. F16D 1/10
(52) U.S. Cl. ...................... 464/182; 464/901; 403/359.4
(58) Field of Search ................. 464/182, 901; 403/359.3, 359.4, 359.6, DIG. 8

(56) References Cited

U.S. PATENT DOCUMENTS

| | | | | |
|---|---|---|---|---|
| 2,857,185 | A | * 10/1958 | Hofer | .......................... 464/901 |
| 3,517,953 | A | * 6/1970 | Wright et al. | ........ 403/359.3 X |
| 4,927,286 | A | * 5/1990 | Hobluigie et al. | ....... 403/322.2 |
| 4,968,292 | A | * 11/1990 | Takeda | ................ 403/359.6 X |

FOREIGN PATENT DOCUMENTS

| | | | | |
|---|---|---|---|---|
| DE | 1 231 529 | * 12/1966 | ............. | 403/359.4 |
| DE | 28 47 190 | * 5/1980 | | |
| JP | 2-17221 | * 1/1990 | | |

OTHER PUBLICATIONS

Sho drawing of "Schenck Turner Model 6515GAL Upper Tooling Assembly" for 310 mm Torque Converter, Schenck Turner Inc., 100 Kay Industrial Drive, Orion, MI 48359, USA, (circa 1985).

* cited by examiner

Primary Examiner—Greg Binda
(74) Attorney, Agent, or Firm—W. F. Fasse; W. G. Fasse (57) ABSTRACT

A splined shaft head for engaging a splined hub includes first, second and third stages. The first stage has a conical taper on one side, and a cylindrical setback on the other side, which transitions through a tapered shoulder to the cylindrical body of the shaft head. The second stage includes lead spline teeth extending along the cylindrical body to the conical taper. The third stage includes torque-transmitting main spline teeth regularly arranged around the circumference. The shaft head is rotated while being inserted axially into the hub. The first stage allows radial free play and de-centering of the hub so the lead spline teeth find a proper rotational alignment with spline grooves of the hub. Then, the tapered shoulder at the end of the first stage positively centers the hub on the shaft axis, and finally the main spline teeth of the third stage provide full form-locking engagement.

29 Claims, 4 Drawing Sheets

SELF-ALIGNING SPLINED MALE SHAFT HEAD AND ENGAGEMENT METHOD

FIELD OF THE INVENTION

The present invention relates to a male shaft head having spline teeth for engagement into a splined female hub or the like.

BACKGROUND INFORMATION

In many mechanical applications in various different technical fields, it is necessary to temporarily or releasably engage two rotatable members with each other. Predominantly this involves engaging a rotatable male shaft head into a rotatable female hub or other receiver opening. Throughout this specification, the term "hub" will be used generally to refer to any opening or recess adapted to receive a male shaft head therein. The engagement of the male shaft head into the female hub is commonly achieved by providing one or more axially longitudinally extending keys or spline teeth on the outer circumference of the shaft head, and corresponding spline grooves or keyways on the inner circumference of the hub. The splined shaft head further has corresponding spline grooves respectively between neighboring spline teeth, and the splined hub has spline teeth respectively between neighboring spline grooves. The spline teeth of the male shaft head slidingly engage with the corresponding spline grooves in the hub, so as to connect the shaft head with the hub in a rotation- or a torque-transmitting manner.

While the above described typical splined interconnection between the shaft head and the hub provides a good positive form-locking connection for torque transmission between the two components, it is generally difficult and problematic to achieve the connection Namely, in order to insert the splined male shaft head into the splined hub, the shaft head and the hub must be precisely aligned with each other in terms of their respective radial positions and in terms of their respective rotational positions. In other words, the center axis of the shaft head must be precisely aligned with the center axis of the hub, and the splined teeth of the shaft head must be precisely rotationally aligned with the corresponding spline grooves of the hub. Otherwise, it will not be possible to insert the shaft head into the hub, due to the blocking contact of the spline teeth of the two components with each other. Moreover, if there is only a slight misalignment between the two parts, in either the rotational or radial directions, the front edges of the spline teeth will suffer wear, which becomes cumulative over the course of repeatedly connecting and disconnecting the shaft head to and from mating splined hubs.

To address some of the above problems, it is also conventionally known to provide a splined shaft head with at least one spline tooth or a spline segment including plural spline teeth, which is spring-loaded and radially deflectable relative to the remaining body of the shaft head. As such a shaft head is inserted into the hub, the spring-loaded tooth or teeth will deflect radially inwardly against the spring-biasing force in order to allow some elastic play or yielding between this tooth or teeth of the shaft head and the hub. Thereby, the spring-loaded teeth are intended to click into place in the proper alignment with the spline grooves of the splined hub due to the biasing force of the spring that urges these teeth radially outwardly. Once the spring-loaded teeth are engaged properly in the spline grooves of the hub, the remaining fixed teeth will also be properly engaged into the corresponding spline grooves of the hub to establish the full torque transmitting engagement of the shaft head to the hub.

The above described spring-loaded shaft head, however, suffers several disadvantages and problems in actual use. Particularly, the spring-loaded tooth or teeth suffer rapid wear, because the spring-loaded arrangement thereof purposely allows for misalignment and play between the spline teeth of the shaft head and the spline grooves of the hub, and then urges the spring-loaded spline teeth into the proper alignment and engagement with the spline grooves of the hub with an elastic spring-load applied thereto. Also, the moveable spring-loaded arrangement of these teeth sometimes leads to jamming of the shaft head with an improper alignment relative to the hub. As a result of the loose or yielding arrangement, and especially further in view of the resulting wear and occasional jamming, the spring-loaded shaft head cannot ensure a high degree of precision and play-free engagement between the shaft head and the hub. As a further disadvantage, such a spring-loaded shaft head suffers high costs and effort with regard to the initial manufacturing and installation thereof, and in relation to ongoing maintenance and replacement thereof, especially in view of the assembly of separate moving parts that is required.

One field of application in which it is necessary to repeatedly couple and uncouple a shaft head with one or more mating hubs is in measuring the unbalance of rotating bodies and then carrying out a balancing of the rotating bodies. A particular example is the unbalance measuring and balancing of torque converters used in the drive trains of motor vehicles and the like. Before its final installation, a torque converter must be balanced to ensure proper and smooth operation thereof. Very generally, such a torque converter comprises inner parts including a turbine, a clutch plate and a stator arranged within an outer shell. The is inner parts have typically been pre-balanced during manufacturing and assembly thereof. The outer shell, however, needs to be balanced in a final balancing step. To achieve this, a balancing machine includes a first tooling that couples to the outer shell and a second tooling that couples to the inner parts and especially the turbine. Typically, the first tooling is connected to a lower drive, while the second tooling is connected to an upper drive, which then respectively rotate the outer shell and the inner parts respectively through the first tooling and the second tooling, about a vertical rotation axis.

For measuring the unbalance of the outer shell, the outer shell and the inner parts are both rotated together, by means of the first tooling and the second tooling as mentioned above. Hereby it is critical that the inner parts must be held very "still" relative to the outer shell. In other words, while the inner parts are freely rotatable relative to the outer shell, during the unbalance measuring, the inner parts must be rotated exactly in synchronism with the outer shell, so that there is no relative rotation between the inner parts and the outer shell. During this rotation, the unbalance of the torque converter unit is measured by any conventionally known method and means, generally based on the radial forces exerted by the rotating body as it rotates. Then, the inner parts are rotated or rotationally offset by 180° relative to the outer shell and thereafter once again the outer shell and inner parts are rotated together in perfect synchronism, and the overall unbalance of the torque converter unit is measured a second time. By comparing the two unbalance measurement results, the unbalance of the outer shell itself can be derived or calculated.

Then, the unbalance data are used to control a balancing procedure, for example by removing material from or adding material to the outer shell at appropriate locations to balance out the outer shell. A further unbalance measurement procedure, or so-called audit run, is carried out after performing the balance corrective steps to ensure that the balancing steps did actually achieve a proper balancing of the outer shell.

The above application of torque converter balancing places high demands on the splined shaft head of the second tooling that engages the inner parts of the torque converter. Namely, since this balancing operation must be carried out on every torque converter, the balancing equipment tooling, and particularly the splined shaft head, is repeatedly engaged with and disengaged from the respective splined openings or hubs of successive torque converters that are to be tested and balanced in a series production manner. This leads to rapid cumulative wear of the splined shaft head as generally discussed above. Also, since the unbalance measuring operation requires extreme precision and a play-free rotational interconnection between the tooling shaft head and the torque converter turbine hub, the splined shaft head must ensure such a precise play-free engagement in the hub. Essentially the connection provided by the splined shaft in the splined hub must be absolutely stable and fixed, so that the inner parts of the torque converter substantially form a single integral unit with the shaft head and the rest of the second tooling that engages the inner parts of the torque converter. Furthermore, this precision and play-free engagement must be consistent or reproducible between the first unbalance measuring run and the audit run, or otherwise any play or the like would have an effect on the unbalance measurement and result in erroneous data giving the appearance that the balancing procedures were not effective. This would lead to a continuously repeated sequence of measuring and balancing steps without ever achieving a certifiable proper balance.

When the above described conventional splined shaft heads have been used to provide the required connection to the torque converter turbine hub in this context, they have not been able to achieve high-accuracy satisfactory results. To the contrary, the conventional splined shaft heads suffer rapid wear and a somewhat loose connection with play leading to imprecise unbalance measuring results. Also, it has been a continuing difficulty to achieve the required rotational and radial alignment of the shaft head relative to the torque converter turbine hub for engaging the shaft head into the hub. In the typical method of using such a conventional splined shaft head, the shaft head is not rotating as it is inserted axially into the hub. It must be ensured that a sufficient rotational alignment of the shaft head relative to the hub exists, before the shaft head can be axially inserted into the hub. Difficulties encountered while coupling the torque converter to the balance measuring equipment lead to extra effort and time, which in turn lead to extra costs in the overall manufacturing of the torque converters.

SUMMARY OF THE INVENTION

In view of the above, it is an object of the invention to provide a splined shaft head that improves the play-free precision and reproducibility of a form-locking engagement of the shaft head into a splined hub. The shaft head according to the invention further aims to have a simplified structure, suffer reduced wear, and avoid jamming misalignment, in comparison to the prior art. Another object of the invention is to provide a simplified, faster and trouble-free method of engaging a splined shaft head into a splined hub. The invention further aims to avoid or overcome the disadvantages of the prior art, and to achieve additional advantages, as apparent from the present specification.

The above objects have been achieved according to the invention in a splined shaft head having a special configuration including distinct first, second and third stages, and in a special insertion method. The first stage, which adjoins and extends rearwardly from a forward free end of the shaft head, includes an outer contour that is not rotationally symmetrical and is eccentrically offset in a first radial direction relative to a major central shaft axis of the shaft head, about which the shaft head is rotatable. This first stage allows the shaft head to be inserted into the hub without requiring perfect co-axial alignment thereof. The second stage of the shaft head adjoining the first stage includes at least one lead spline tooth that is arranged on a side of the shaft head located in the first radial direction relative to the major central shaft axis and that rotationally aligns and pre-engages the shaft head into the hub. Next, the third stage includes at least one main spline tooth that fully engages the shaft head into the hub in a torque-transmitting manner.

The insertion of the shaft head into the hub is preferably carried out by simultaneously rotating and axially advancing the shaft head relative to the hub, without requiring a precise alignment thereof. Instead, it is only necessary to coarsely align the shaft head with the hub, so that the reduced outer dimension of the first stage of the shaft head will go into the open mouth of the hub. As the forward end of the shaft head is introduced into the hub, the eccentrically offset outer contour of the first stage serves to provide a radial play between the shaft head and the hub, whereby the range of this radial play is radially eccentrically offset or un-centered in the first radial direction relative to the central longitudinal shaft axis of the shaft head. Thereby the shaft head promotes a preferential de-centering of the hub relative to the shaft axis of the shaft head in the first radial direction radially outwardly toward the lead spline teeth, i.e. so as to provide radial free play on the side of the lead spline teeth. At a minimum, the shape of the first stage, as it is inserted into the hub, prevents the hub from being de-centered in a radial direction opposite the lead spline teeth, and instead pulls the hub radially toward the lead spline teeth at least into a centered position. This ensures that the shaft head can be inserted into the hub, even if there is initially not a perfect coaxial alignment between the shaft axis of the shaft head and the rotational axis of the hub. This also ensures that the lead spline tooth or teeth of the second stage will accurately engage the splined grooves of the hub.

Namely, as the second stage is inserted into the hub, the at least one lead spline tooth will rotate and axially advance (with the rotating and axially advancing shaft head) relative to the non-rotating hub, until this at least one lead spline tooth comes into rotational alignment with a corresponding spline groove of the hub and axially advances into engagement with this spline groove to establish a pre-engagement of the shaft head with the hub, whereby the hub is then carried along to rotate with the shaft head. Preferably, the first stage overlaps with the second stage, so that the at least one lead spline tooth engages into a respective spline groove of the hub while the hub is still de-centered or provided with a de-centered radial play relative to the shaft axis of the shaft head. This de-centering and the smaller outer dimension of the first stage allows a sufficient degree of play between the shaft head and the hub during insertion of the first stage (and beginning of the second stage) into the hub, to allow the one or more lead spline teeth of the second stage to engage into corresponding spline grooves of the hub, even if the shaft head and the hub were initially not in rotational and radial, i.e. coaxial, alignment with each other. This effect is especially achieved by rotating the shaft head while axially inserting it into the hub. Thereby, the shaft head "finds" its proper rotational alignment with the hub during the insertion of the first stage and then the second stage into the hub.

Once the shaft head is inserted into the hub past the first stage, the hub becomes positively centered relative to the shaft axis, in that the eccentrically offset outer contour and reduced outer dimensions of the first stage transition to a concentric cylindrical body of the shaft head. At this point, the one or more lead spline teeth have come into proper engagement in corresponding spline grooves of the hub, and thereby the shaft head and the hub are now properly aligned, both rotationally and radially, and are pre-engaged with each other. Finally, the shaft head is further inserted into the hub so that the additional full engagement spline teeth or main spline teeth come into engagement with additional spline grooves of the hub, to provide a full torque-transmitting form-locking engagement between the shaft head and the hub. At this point, the full rotational torque can be transmitted from the shaft head to the hub.

The present inventive shaft head and method for its use provide a simpler shaft head structure, and a simpler process for engaging the shaft head into a hub, in comparison to the prior art. Also, tests that have been carried out using a shaft head according to the invention have shown that the inventive shaft head suffers reduced wear, avoids jamming due to mis-alignment in a splined hub, and achieves improved precision and reproducibility of a play-free form-locking engagement of the shaft head with a hub. A surprisingly high degree of precision without play, essentially a completely rigid, as-if-integral, connection between the hub and the shaft head is reproducibly achieved.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
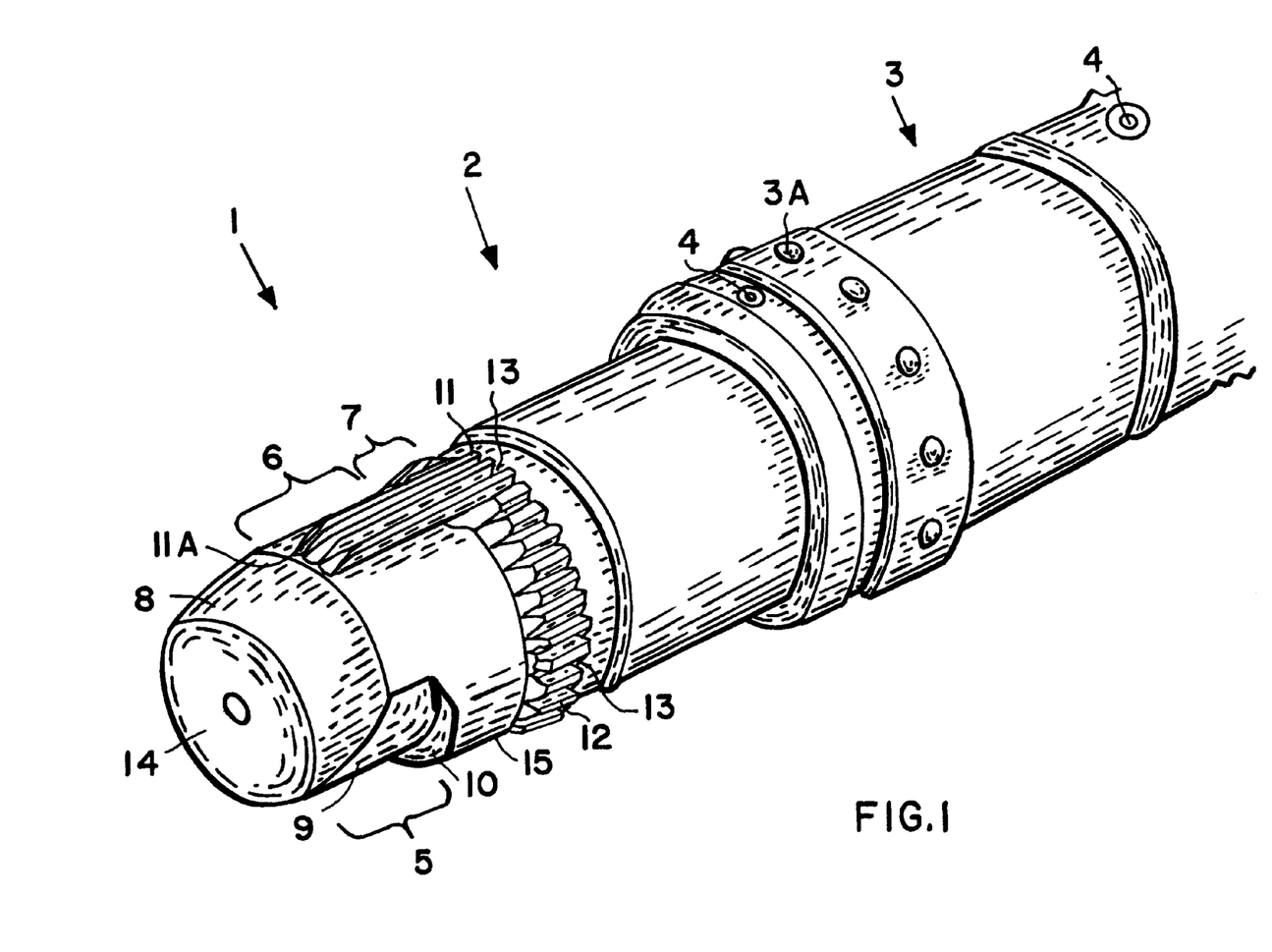
FIG. 1 is a schematic perspective view of a shaft head according to the invention mounted in a holder on a shaft.
Figure 2:
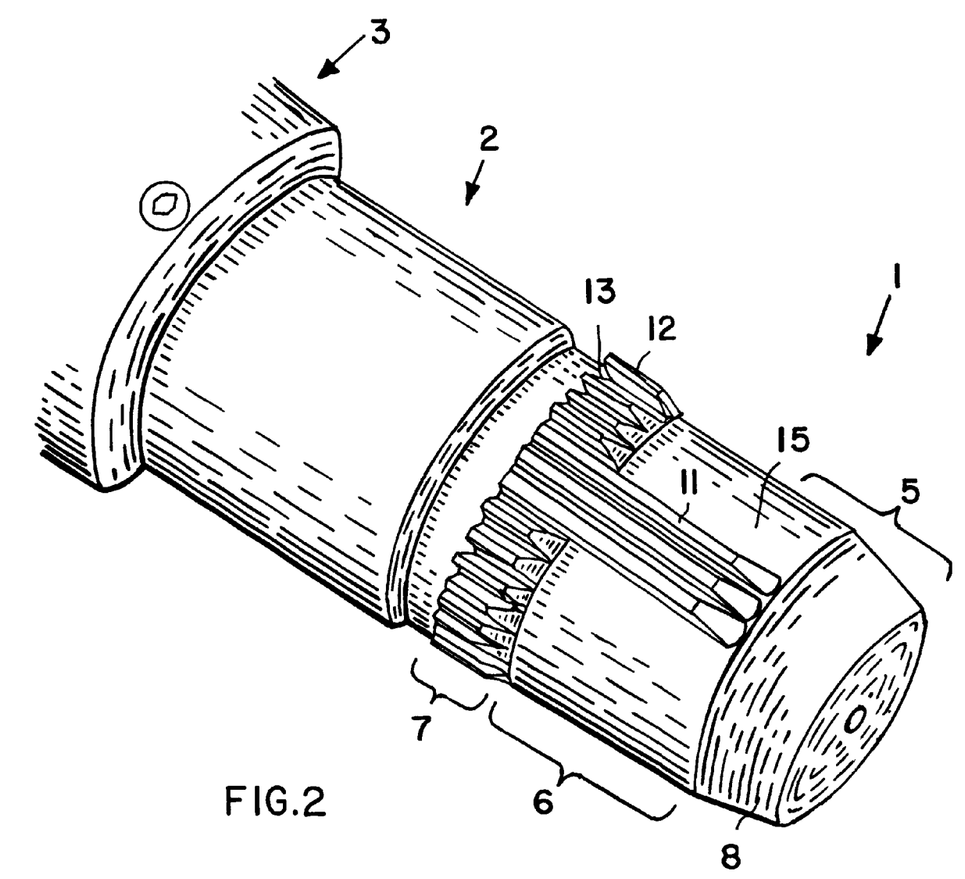
FIG. 2 is a perspective side view of the shaft head according to FIG. 1, in a slightly rotated position to show three lead spline teeth.

FIG. 1 shows a general schematic perspective view of a shaft head 1 according to the invention mounted or held in a shaft head holder or chuck 2 which in turn is mounted in or on a tool shaft 3. The shaft head 1 and the shaft head holder 2 may be a single integral piece, but are preferably separate pieces as in the present example embodiment, to allow a cost effective exchange of only the shaft head 1 in the event that it becomes worn or damaged over long term use, or to allow differently dimensioned splined hubs to be accommodated by simply changing the shaft head 1. The connections of the respective parts can be achieved by a form-locking plug-in shape of each part into the next part, and/or by securing with set screws 4 or the like.

The tool shaft 3 can be any rotating shaft that is to be releasably or temporarily connected to a rotatable hub. In the present example embodiment, the tool shaft 3 is the rotatable tool shaft of the inner tooling or upper tooling of a torque converter balancing machine. For purposes not pertinent to the present invention, the tool shaft 3 includes detent balls 3A or other features that would not be applicable for all applications of the present splined male shaft head 1.

The splined male shaft head 1 itself is preferably a single integral part that is machined from a suitable hard material, for example hardened carbon steel, which may be machined and hardened in any conventionally known manner. The shaft head 1 has a special configuration according to the invention, including a first stage 5 that functions as a de-centering and centering stage, a second stage 6 that functions as a pre-engagement stage, and a third stage 7 that functions as a full engagement stage. Each of these stages includes special configuration features, which will now be discussed.

Figure 3:
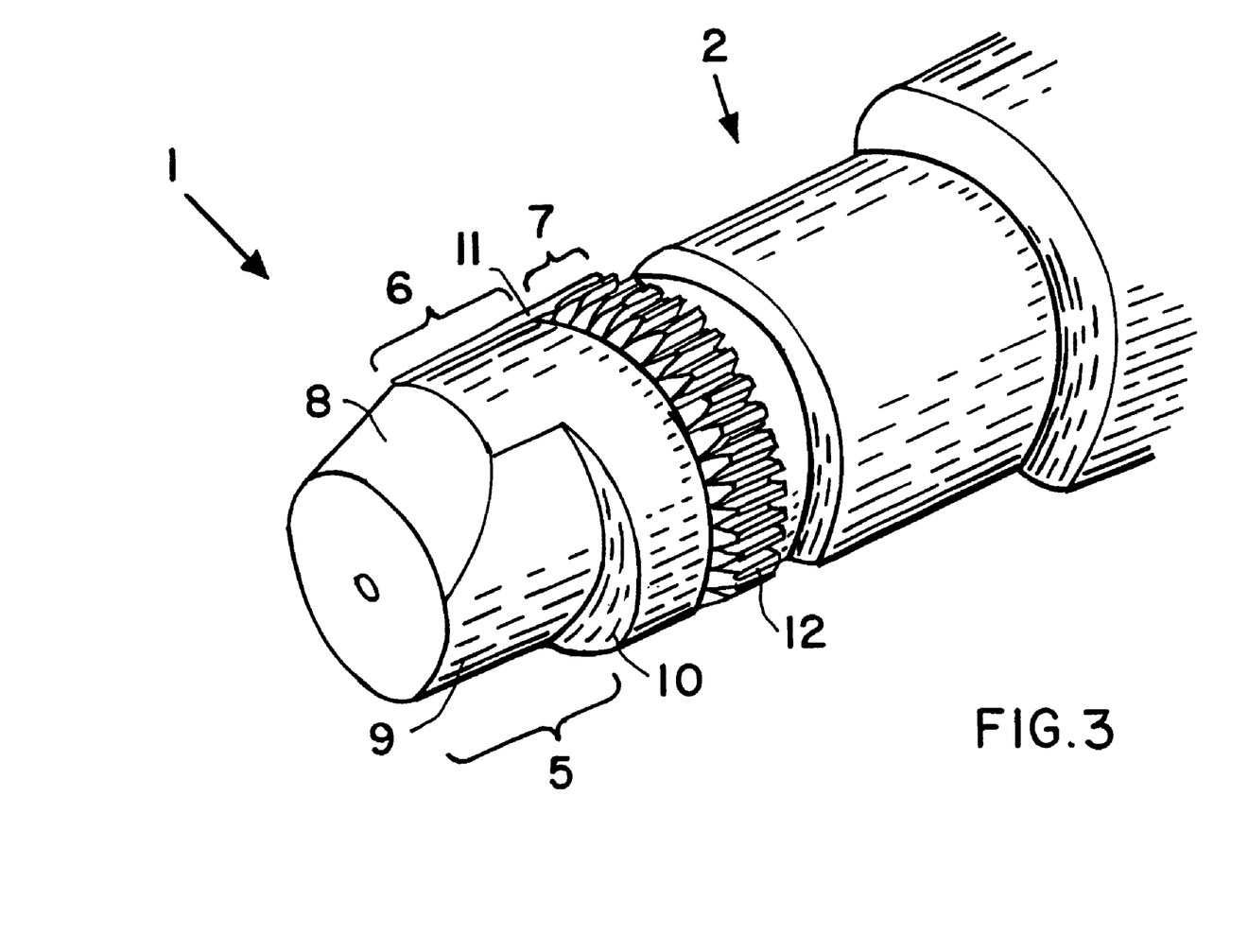
FIG. 3 is a further perspective view of the inventive shaft head rotated to another position to show the eccentric cylindrical contour of a relief or cutback area of the first stage of the shaft head.
Figure 4:
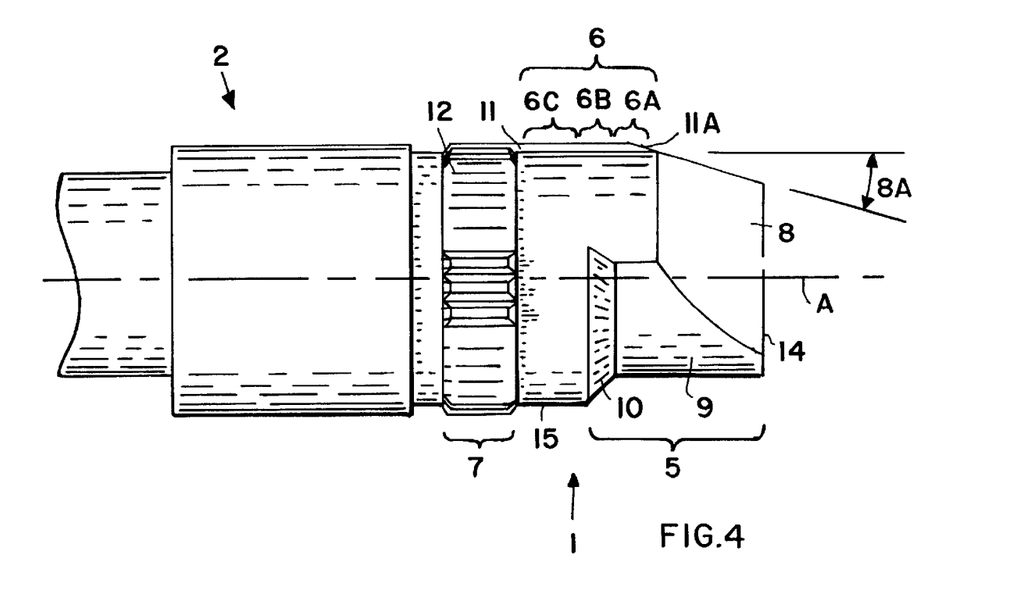
FIG. 4 is a schematic side view of the inventive shaft head.
Figure 5:
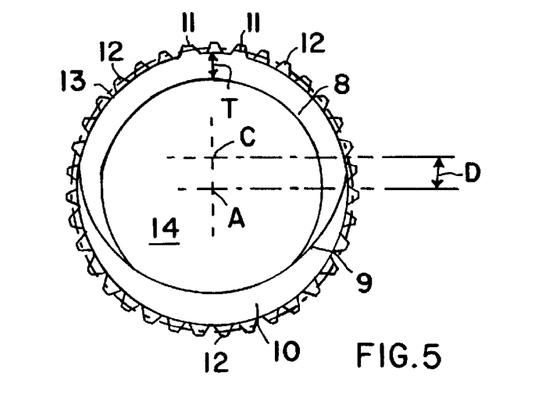
FIG. 5 is a schematic end view of the inventive shaft head illustrating the offset center of the eccentric portion of the first stage.

The first stage 5 adjoins and extends rearwardly from the free forward end 14, i.e. the end face 14, of the shaft head 1. The first stage 5 includes a non-symmetrical outer contour with an eccentric offset relative to the shaft axis A, and with smaller outer dimensions in comparison to the maximum outer diameter of the concentric cylindrical body 15 of the shaft head 1. Particularly, in this embodiment, the first stage 5 of the shaft head 1 includes a conical taper 8 on one side thereof and an eccentric cylindrical relief or cutback 9 forming an eccentric curved surface on the opposite side thereof, i.e. rotationally offset from the conical taper 8 by 180°. The first stage 5 further includes a tapered shoulder 10 that transitions from the radially inwardly offset contour of the eccentric cylindrical relief 9 to the larger outer diameter of the concentric cylindrical body 15. In this regard, see FIGS. 3, 4 and 5 in connection with FIG. 1. The conical taper 8 extends at a taper angle 8A that is typically about 15°, but may have any other conical taper angle to achieve the required de-centering effect in any particular application. The eccentric cylindrical relief or cutback 9 extends axially along the shaft head 1 from the forward end face 14 thereof for a greater axial distance than the conical taper 8, as evident in FIGS. 1, 3 and 4. The eccentric cylindrical relief 9 is defined by a partially cylindrically curved surface or cylindrical wall contour 9 preferably with the same radius of curvature of the general cylindrical body 15 of the shaft head 1. However, this curvature of the partially cylindrically curved surface of the eccentric cylindrical relief 9 is defined about an eccentric or off-axis center of curvature C that is radially offset from the central shaft rotation axis A in a radial direction toward the lead spline teeth 11 and toward the conical taper 8 by an offset distance D, which corresponds to the maximum eccentric relief or cutback provided by the eccentric cylindrical relief 9, as shown in FIG. 5. Also, this offset distance D preferably corresponds to the radial taper distance T, and is preferably at least equal to the radial protrusion height of the lead spline teeth 11.

Thereby, the forward end face 14 has a diameter or dimension extending diametrically between the conical taper 8 and the eccentric cylindrical relief 9, that is preferably still centered on the shaft rotation axis A. Simultaneously, the maximum outer dimension of the forward end face 14 of the shaft head 1 is smaller than the outer diameter of the outer concentric cylindrical body 15 of the shaft head 1, which ultimately defines the engagement diameter of the mating splined hub into which the shaft head will be engaged. However, as the conical taper 8 slopes out to the larger diameter of the cylindrical body 15, while the cylindrical relief wall 9 extends parallel to the axis A, the dimensional center of the first stage shifts ever more radially away from the central shaft axis A. This is the configuration that causes the radial play de-centering effect, and then the tapered shoulder 10 causes a centering effect, as will be discussed in greater detail below.

The second stage 6 includes at least one lead spline tooth 11, and in this embodiment three lead spline teeth 11 grouped next to one another with respective spline grooves 13 therebetween, which achieve a pre-engagement of the shaft head 1 with the splined hub, as will be discussed below. The third full engagement stage 7 comprises a plurality of main spline teeth or full engagement spline teeth 12 with respective spline grooves 13 therebetween (or in general at least one additional main spline tooth 12), which achieve a full torque transmitting connection between the shaft head 1 and the mating splined hub. In this regard, the lead spline teeth 11 extend axially closer than the main spline teeth 12 to the front end 14 and preferably are full-length spline teeth that extend along the axial length of the main spline teeth 12 and then further extend axially toward the forward end 14, terminating at sloping front tooth ends 11A that adjoin the conical taper 8, along the concentric cylindrical body 15 of the shaft head 1. The at least one lead spline tooth 11 is or are arranged on the same side of the shaft head 1 as the conical taper 8, and thus is or are circumferentially centered 180° opposite the eccentric curved surface formed by the cylindrical relief or cutback 9. Also, a portion of the cylindrical surface of the cylindrical body 15 without spline teeth 11 or 12 thereon extends between the tapered shoulder 10 and the third stage 7 including the at least one main spline tooth 12.

The process and functional features of inserting and engaging the shaft head 1 into a mating hub will now be discussed in further detail. The first stage 5 is the first portion of the shaft head 1 that is inserted into the splined hub, preferably while the shaft head 1 is being rotated about the center axis A of the shaft head 1, which coincides with the shaft axis about which the tool shaft 3 is rotatably driven. When the free forward end of the first stage 5 of the shaft head 1 is first inserted into the mating female hub, there is a radial clearance or play allowance defined by the radial offset distance D and/or the radial taper distance T, which are achieved by the combination of the conical taper 8 and the eccentric cylindrical relief 9 as described above. This allows the shaft head 1 to be easily inserted into the hub, even without an exact radial (i.e. coaxial) alignment of the shaft axis A with the center axis of the hub.

As the first stage 5 of the shaft head 1 is further inserted into the mating hub, assuming that the shaft head 1 and hub are not exactly coaxially aligned, the conical taper 8 will come into contact with a side of the hub, i.e. with the internal spline teeth of the hub on this side, and push the hub radially outwardly away from the shaft axis A as the hub rides radially outwardly along the conical taper 8 while the shaft head 1 is axially advancing and rotating. Meanwhile, the opposite wall of the hub slides along the cylindrical wall or in the clearance space of the eccentric cylindrical relief 9. In any event, the cooperation of the conical taper 8 with the eccentric cylindrical relief 9 ensures that, upon complete insertion of the conical taper portion 8 of the first stage 5 into the hub, the hub will be positioned generally centered with play about the shaft axis A of the shaft head 1, while especially or preferably providing play between the side of the shaft head 1 having the lead spline teeth 11 thereon and the correspondingly positioned side of the inner wall of the hub. Then as the shaft head 1 is inserted further into the hub, one of two things will happen. If the lead spline teeth 11 happen to be precisely rotationally aligned with corresponding grooves of the splined hub, then the lead spline teeth 11 will axially slide and engage into the corresponding hub grooves, thereby causing the hub to be rotationally carried along with the rotating shaft head 1. On the other hand, if the lead spline teeth 11 are initially not rotationally aligned with corresponding spline grooves of the hub, then the hub will ride radially outwardly along the sloping front tooth ends 11A whereby the hub is de-centered relative to the shaft axis A (which is made possible by the clearance on the other side of the shaft head 1 provided by the eccentric cylindrical relief 9), until the rotating teeth 11 slip into corresponding spline grooves of the non-rotating hub and thereby engage the hub and cause it to begin rotating along with the shaft head 1.

The second pre-engagement stage 6 preferably overlaps the first stage 5, and preferably includes a de-centered pre-engagement zone 6A (including the sloping tooth ends 11A) which overlaps the axial range of the eccentric cylindrical relief 9 of the first stage 5, then a centering pre-engagement zone 6B which overlaps the first stage 5 in the axial range of the tapered shoulder 10 adjoining the eccentric cylindrical relief 9, and finally a centered pre-engagement zone 6C which includes the lead spline teeth 11 on the concentric cylindrical body 15. The de-centering and preliminary engagement of the hub and shaft head relative to each other, as described above, occur in the de-centered pre-engagement zone 6A. Then, as the shaft head 1 is inserted further, the tapered shoulder 10 urges the hub radially outwardly in the radial direction opposite the lead spline teeth 11 to positively and surely center the hub onto the cylindrical body 15 of the shaft head 1 about the axis A, in the centering pre-engagement zone 6B. Thereby, it is ensured that the lead spline teeth 11 are positively engaged into corresponding spline grooves of the hub at the latest in this centering pre-engagement zone 6B.

The above described relative position of the hub and the shaft head is referred to herein as being "de-centered" at certain times or stages. This term "de-centered" is to be understood as follows. Actually, due to the special arrangement of free play in radial directions provided by the present shaft head 1 relative to the hub, the position of the hub either may be coaxially aligned with the shaft axis A or may be radially offset, i.e. de-centered. In any event, the special configuration of the first stage 5 provides a bias or a tendency that allows the hub to be de-centered relative to the shaft axis A in a direction of the side of the shaft head provided with the lead spline teeth 11, if that is necessary for allowing the rotational aligning of the lead spline teeth with corresponding spline grooves of the hub as described above. Namely, once the conical taper 8 is entirely inserted into the hub, the hub cannot be de-centered in a direction toward the side of the shaft head opposite the lead spline teeth, but can still be de-centered in a direction toward the side of the lead spline teeth (e.g. by riding up on the sloping tooth ends 11A), because the opposite inner surface of the hub can move into the clearance provided by the eccentric cylindrical relief 9. In this manner, there is still free-play in the radial direction once the second stage 6 with the lead spline teeth 11 begins to be inserted into the hub. Moreover, this free-play will preferentially be provided on the side of the shaft head 1 having the lead teeth 11. thereby, it is ensured that the lead spline teeth 11 can "find" their proper alignment with the corresponding spline grooves of the hub as described above.

Then, coming to the end of the first stage 5, overlapping with the centering pre-engagement zone 6B, the hub will necessarily be brought into coaxial alignment with the shaft axis A of the shaft head 1, by the sloping tapered shoulder 10 coming into contact with the lead-in entrance of the splined hub. At this point, the lead spline teeth 11 have come positively into engagement with corresponding spline grooves of the hub. Then, as the shaft head 1 is further inserted over the centered pre-engagement zone 6C, the coaxial alignment of the hub relative to the shaft axis A is positively ensured and the lead spline teeth 11 are positively slidingly engaged in corresponding spline grooves of the hub. As the shaft head 1 is further inserted into the hub, all of the main spline teeth 12 come into engagement with the corresponding spline grooves of the hub (with an ensured alignment provided by the pre-engaged lead spline teeth 11), thereby achieving a full torque transmitting engagement of the shaft head 1 in the hub.

The entire above described insertion process is carried out with the shaft head 1 rotating, preferably at a reduced speed, e.g about 45 rpm. Namely, the shaft head 1 is simultaneously rotated while being axially advanced into engagement in the hub. It is this combined rotation and axial motion of the shaft head 1, together with the special configuration of the present shaft head 1, that achieves the simple, proper rotational and radial alignment and engagement of the splines of the shaft head into the spline grooves of the hub, without any regard to the initial radial alignment (or misalignment) and rotational alignment (or misalignment) of the shaft head 1 relative to the hub (beyond a coarse alignment simply to get the shaft head into the hub). It is simply necessary to axially drive the shaft head into the hub, while rotating the shaft head and while allowing sufficient radial mobility of the shaft head and/or the hub relative to each other. This "floating" radial mobility allows the above described de-centering of the hub relative to the first stage of the shaft head to be carried out.

Once the shaft head has been fully inserted and engaged in the hub, then the shaft rotation my be increased to its full operating speed and torque, for example 800 rpm in the case of the above described unbalance measuring and balancing of a torque converter.

If the final operating rpm of the coupled shaft is relatively low, e.g. less than 100 rpm, then there is no need to decelerate and accelerate the rotation of the shaft. Namely, the shaft can simply be inserted into the hub while the shaft continues to rotate at its normal operating speed. In any event, there is no need to bring the rotating shaft to a complete stop in order to coupled it into the initially stationary hub, as was the case in the prior art. Thereby, wasted time, effort and energy for running-up and slowing down and stopping the tooling can be avoided. The axial advance speed and the rotation speed of the shaft head during the insertion are selected for a particular application, whereby the rotation speed should be slow enough to avoid excessive wear of the lead spline teeth during their first engagement into the splined hub, and fast enough to achieve a rapid trouble-free engagement and to avoid unnecessarily slowing down the tooling between successive high speed rotation runs.

The inventive shaft head and insertion method achieve a one-shot insertion of the shaft head into the hub, without requiring repetitive trial and error attempts to align and insert the shaft head into the hub, and without requiring any separate steps for achieving the radial and rotational alignment of the shaft head relative to the hub.

During the time of the insertion at which the overlapping second stage 6 and first stage 5 are being inserted into the hub, there may be some slipping or chattering of the forward ends of the lead spline teeth 11 relative to the splining of the hub, until the lead spline teeth 11 properly align with and seat into corresponding spline grooves of the hub. Thus, the forward ends of the lead spline teeth 11 will suffer some wear. For this reason, it is preferred to provide at least three lead spline teeth 11. It is also preferred that the entire shaft head 1 or at least the lead spline teeth 11 are made of highly hardened steel or other hard tool materials. As a further alternative, since the rest of the shaft head 1 does not suffer any appreciable wear in comparison to the lead spline teeth 11, the lead spline teeth 11 can be provided on a removable segment insert that is rigidly fixed in a corresponding insert keyway provided in the remaining body of the shaft head 1. Thereby, it is possible to replace the lead spline teeth 11 if they become worn, without exchanging the entire shaft head 1. In any event, the length of the lead spline teeth 11 overlapping the first zone 5 is sufficient to allow for significant wear of the forward ends of the lead spline teeth 11, without detracting from the proper functionality thereof. Namely, even if the forward ends of the lead spline teeth 11 are worn, as long as the remaining lead spline teeth 11 length overlaps with the first stage 5, then the above described functionality of the invention would not be impaired.

In a further alternative embodiment, the shaft head may have only a single lead spline tooth or lead key, and only a single additional torque transmitting key, for example on the opposite side of the shaft head relative to the lead key. Also, as a further variation from the illustrated embodiment, it is not necessary that the lead spline teeth 11 extend full-length from the rear edge of the main spline teeth up to the edge of the conical taper. Instead, the lead spline teeth could be short teeth provided only in the overlapping area of the first stage with the second stage, or could extend throughout the second stage, while leaving a gap in the area of the first stage. Preferably, however, the lead spline teeth continue full-length through the range of the second stage and the third stage. Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A male shaft head adapted to be engaged into a female hub, and comprising:

a first stage that adjoins a forward end of said shaft head and includes first de-centering means for introducing said shaft head into the hub and for providing radial play between said first stage of said shaft head and the hub, wherein a range of said radial play is eccentrically offset in a first radial direction relative to a central longitudinal axis of said shaft head, and first centering means for eliminating said radial play and for coaxially aligning the hub with said shaft head as said shaft head is inserted beyond said de-centering means into the hub;

a second stage that adjoins and overlaps said first stage and includes second means for rotationally aligning said shaft head with the hub while said radial play is provided therebetween and for then rotationally engaging said shaft head with the hub for positive coupled rotation thereof; and a third stage that adjoins said second stage and includes third means for fully rotationally engaging said shaft head with the hub for torque transmission therebetween.

2. A male shaft head adapted to be engaged into a female hub, said shaft head comprising:
- a first stage that adjoins a forward end of said shaft head, and that has an outer contour which is not symmetrical and is eccentrically offset relative to a central shaft axis of said shaft head;
- a second stage that adjoins said first stage, and that includes at least one lead spline tooth which extends longitudinally parallel to said shaft axis toward said forward end at least to a point adjoining said first stage; and
- a third stage that adjoins said second stage, and that includes at least one main spline tooth which extends longitudinally parallel to said shaft axis toward said forward end no farther than a point adjoining said second stage.

3. The male shaft head according to claim 2, wherein said at least one lead spline tooth extends longitudinally away from said forward end along said third stage.

4. The male shaft head according to claim 3, wherein said at least one main spline tooth comprises a plurality of spline teeth arranged spaced apart from one another at regular pitch spacings around a circumference of said third stage together with said at least one lead spline tooth.

5. The male shaft head according to claim 2, wherein said at least one lead spline tooth comprises a plurality of lead spline teeth extending longitudinally parallel and directly adjacent to each other respectively with spline grooves therebetween.

6. The male shaft head according to claim 5, wherein said plurality of lead spline teeth is exactly three spline teeth.

7. The male shaft head according to claim 2, wherein said at least one lead spline tooth is respectively a rigid fixed tooth that is immovable relative to said at least one main spline tooth.

8. The male shaft head according to claim 2, excluding any movable spline tooth that is movable relative to another one of said spline teeth.

9. The male shaft head according to claim 2, excluding any spring-loaded movable components.

10. The male shaft head according to claim 2, wherein the entirety of said shaft head is a single integral component.

11. The male shaft head according to claim 2, wherein said outer contour of said first stage is eccentrically offset in a first radial direction relative to said central shaft axis, and wherein said at least one lead spline tooth is arranged on a first side of said shaft head located in said first radial direction relative to said central shaft axis.

12. The male shaft head according to claim 2, wherein said outer contour of said first stage includes a conical taper portion that tapers from said second stage to said forward end.

13. The male shaft head according to claim 12, wherein said at least one lead spline tooth extends to and terminates longitudinally toward said forward end at a sloping tooth end of said at least one lead spline tooth that adjoins said conical taper portion.

14. The male shaft head according to claim 12, wherein said second stage and said third stage each respectively further include a respective portion of a cylindrical shaft head body with a cylindrical surface that is concentric about said central shaft axis, wherein said at least one lead spline tooth and said at least one main spline tooth protrude radially outwardly from said cylindrical surface of said cylindrical shaft head body, and wherein said outer contour of said first stage further includes an eccentric curved surface that is located radially inwardly relative to said cylindrical surface of said cylindrical shaft head body and that is eccentric relative to said central shaft axis.

15. The male shaft head according to claim 14, wherein said eccentric curved surface is a partial cylindrically curved surface with a center of curvature offset from said central shaft axis in a radial direction toward said conical taper portion.

16. The male shaft head according to claim 14, wherein said eccentric curved surface and said conical taper portion are respectively circumferentially centered 180° opposite one another, and circumferentially merge into one another.

17. The male shaft head according to claim 14, wherein said eccentric curved surface extends farther than said conical taper portion longitudinally along said shaft head from said forward end in a direction toward said third stage.

18. The male shaft head according to claim 17, wherein a longitudinal range of said at least one lead spline tooth longitudinally overlaps a longitudinal range of said eccentric curved surface.

19. The male shaft head according to claim 14, wherein said eccentric curved surface and said at least one lead spline tooth are respectively circumferentially centered 180° opposite one another.

20. The male shaft head according to claim 14, wherein said outer contour of said first stage further includes a tapered shoulder adjoining and transitioning between said eccentric curved surface and said cylindrical surface of said cylindrical shaft head body.

21. The male shaft head according to claim 2, wherein said second stage and said third stage each respectively further include a respective portion of a cylindrical shaft head body with a cylindrical surface that is concentric about said central shaft axis, wherein said at least one lead spline tooth and said at least one main spline tooth protrude radially outwardly from said cylindrical surface a of said cylindrical shaft head body, and wherein said outer contour of said first stage includes an eccentric curved surface that is located radially inwardly relative to said cylindrical surface of said cylindrical shaft head body and that is eccentric relative to said central shaft axis.

22. The male shaft head according to claim 21, wherein said eccentric curved surface is a partial cylindrically curved surface with a center of curvature offset from said central shaft axis in a radial direction toward said at least one lead spline tooth.

23. The male shaft head according to claim 21, wherein a longitudinal range of said at least one lead spline tooth longitudinally overlaps a longitudinal range of said eccentric curved surface.

24. The male shaft head according to claim 21, wherein said eccentric curved surface and said at least one lead spline tooth are respectively circumferentially centered 180° opposite one another.

25. The male shaft head according to claim 21, wherein said outer contour of said first stage further includes a tapered shoulder adjoining and transitioning between said eccentric curved surface and said cylindrical surface of said cylindrical shaft head body.

26. The male shaft head according to claim 25, wherein a portion of said cylindrical surface without spline teeth thereon extends between said tapered shoulder and said third stage including said at least one main spline tooth.

27. The male shaft head according to claim 2, wherein said first stage and said second stage longitudinally overlap one another.

28. The male shaft head according to claim 2, wherein said outer contour of said first stage has a smaller diametrical outer dimension than said second stage and said third stage.

29. A method of engaging the male shaft head according to claim 2 into a splined female hub, comprising the following steps:
  a) rotating and simultaneously axially advancing at least one of said shaft head and said hub relative to each other so as to insert at least a portion of said first stage into said hub thereby forming a radial free play between said first stage and said hub, wherein a range of said radial free play is de-centered relative to said central shaft axis;
  b) continuing said rotating and said axial advancing so as to insert at least a portion of said second stage into said hub thereby engaging said at least one lead spline tooth correspondingly into at least one spline groove of said hub and thereby causing said hub and said shaft head to rotate together in unison;
  c) continuing said rotating and said axial advancing so as to insert said shaft head beyond said first stage into said hub, thereby positively centering said hub and said shaft head relative to each other about said central shaft axis; and
  d) continuing said rotating and said axial advancing so as to fully insert said third stage into said hub while engaging said at least one main spline tooth correspondingly into at least one spline groove of said hub.

* * * * *